US005977484A

United States Patent [19]

Jones et al.

[11] Patent Number: 5,977,484

[45] **Date of Patent: *Nov. 2, 1999**

[54] LOW-ODOR DUAL ELEMENT CABLE CONNECTION COVER

[76] Inventors: Michael G. Jones, 220 Bingham St., San Marcos, Calif. 92069; Bernard K. Mueller, 31320 Club Vista Ln., Bonsall, Calif. 92003

[ * ] Notice: This patent is subject to a terminal disclaimer.

[21] Appl. No.: 08/780,290

[22] Filed: Jan. 8, 1997

[51] Int. Cl.$^{6}$ .............................. H01B 7/00; H01B 7/28; F16L 11/12

[52] U.S. Cl. .................... 174/135; 439/730; 439/DIG. 8; 174/93; 174/74 A

[58] Field of Search .................................... 439/730, 367, 439/932; 174/135, DIG. 8, 93, 74 A

[56] References Cited

U.S. PATENT DOCUMENTS

| | | | |
|---|---|---|---|
| 3,708,611 | 1/1973 | Dinger | 174/84 C |
| 4,419,322 | 12/1983 | Clemence et al. | 264/343 |
| 4,506,430 | 3/1985 | Guzay, Jr. | 29/450 |
| 4,685,683 | 8/1987 | Hall et al. | 277/1 |
| 4,865,890 | 9/1989 | Erlichman | 428/35.1 |
| 4,968,857 | 11/1990 | McGrane | 174/84 C |
| 4,976,796 | 12/1990 | Feitzelmayer | 156/49 |
| 5,755,465 | 5/1998 | Stewart, Jr. et al. | 285/381.5 |
| 5,801,333 | 9/1998 | Jones | 174/DIG. 8 |

FOREIGN PATENT DOCUMENTS

| | | |
|---|---|---|
| 0845845A1 | 11/1996 | European Pat. Off. . |

OTHER PUBLICATIONS

1996 Rubber Red Book (48th edn.) [Intertec Publg.: 1996], pp. 288, 290 and 292.

Mark et al. (eds.), Encyclopedia of Polymer Science and Technology, vol. 15, pp. 380–384 (John Wiley & Sons, 1989).

Roff et al., Fibres, Films, Plastics and Rubbers, § 55, pp. 509–514 (Butterworths, 1971).

Harper (ed.) Handbook of Plastics and Elastomers, pp. 4–50 through 4–65 (McGraw–Hill Book Co., 1975).

Chomerics, Inc. Cho–shrink heat shrinkable connector boots, Nov. 1969.

Raychem, Cable Splice Enclosure (174/Dig8), 1971.

AMP, Catalog 82750, p. 10004, Jul. 1995.

*Primary Examiner*—Kristine Kincaid
*Assistant Examiner*—Mark Olds
*Attorney, Agent, or Firm*—Brown Martin Haller & McClain LLP

[57] ABSTRACT

A low odor cover for a connector of a cable is disclosed, which has two interfitting sleeves which are chemically swellable and which are initially in dilated configuration, and which subsequently shrink into place by evaporation of the volatile dilation composition. Both sleeves are made of a high density elastomeric material, such as a natural or synthetic rubber, preferably (EPDM), neoprene or Hypalon™ rubbers. The volatile liquid combination dilation composition used is composed of a $C_7$-$C_8$ aliphatic hydrocarbon component and a fluorocarbon component. The device provides a protective cover for a cable connection or splice which can be easily installed, quickly shrunk into tight vapor resistant protective covering within a matter of a few minutes, and can be installed without the need for any application of heat or use of special tools, equipment or materials.

41 Claims, 1 Drawing Sheet

LOW-ODOR DUAL ELEMENT CABLE CONNECTION COVER

BACKGROUND OF THE INVENTION

1. Field of the Invention

The invention herein relates to electrical cable, such as television transmission cable, and connectors therefor. More particularly, it pertains to cover devices to protect such connectors from the ambient environment.

2. Description of the Prior Art

Many cable connections are positioned where they are subject to adverse ambient environments, particularly where the connection will be subject to moisture contact from rain, snow or humidity. A typical example is a connection for a television signal transmission cable, where the cable is attached to a transmission facility outlet, a retransmission station or a subscriber's connection, such as a residence. Some protection may be afforded by enclosing the connection in a housing, such as the small junction boxes for subscriber hookups commonly seen in residential neighborhoods. However, such housings are not completely weathertight, and in any event many connections remain in the open, or are located in positions where housings are not practical.

Further, in many cases connections must be made during adverse weather. If, for instance, a cable television circuit or an electric power circuit goes out because of a heavy rainstorm, the immediate demands for restored service by the subscribers require the transmission company to send repair people to make the necessary repairs to the cable as quickly as possible, notwithstanding that the storm may be continuing. Such repairs to a large extent require the installation of new connectors, either for cable splices or for re-connection to transmission or receiving facilities. However, to minimize potential damage to the connectors, their exposure to the elements should be as brief as possible. This requirement for brief exposure (i.e., quick repair) is of course reinforced by the fact that commonly during such a storm there are many service disruptions and the repair people need to spend as little time as possible repairing each individual connection so that they will be able to move quickly to restore service systemwide.

It has been known for some time that it is advantageous to cover such cable connections (whether television transmission cable or other types of electrical cable) to minimize the exposure of the connections to the elements, particularly to moisture. Since the cable segments themselves have moisture impervious coverings throughout their length, the particularly vulnerable portions of a cable system are the individual connectors, which are usually screw-type or soldered metal fittings. Wrapping such connectors with moisture-resistant tape has not proved satisfactory, since the adhesive holding the tape does not adhere well to wet surfaces to start with, and even if initially well-adhered, tends to deteriorate with age and the tape becomes loosened. In addition, tape wrapping is a time consuming procedure and often difficult to do properly in cramped or enclosed locations.

Heat shrinkable tubing has also been used to cover connections. Heat shrinkable tubing is tubing made of thermoplastic polymeric materials which, when subjected to elevated temperatures, shrink and contract around the connection. While such heat shrink tubing has proved more effective than tape wrapping, it still has a number of serious deficiencies. For instance, heat shrinking takes a considerable amount of time for the large diameter, relatively thick wall tubing necessary to use with large diameter cable connectors. Thus, cable installers or repair crews find that while the cable connections themselves may be made quickly, an inordinate amount of time must subsequently be spent slowly shrinking the heat shrink tubing to fit. The shrinking cannot be expedited by applying additional heat. The additional heat will simply char and damage the plastic tubing, rather than appreciably speeding the shrinking process. Further, excessive heat applied to the cable protector will also damage the foam dielectric component of the cable itself. Of course, in many instances, particularly at remote locations, a suitable source of heat is not available to the installation or repair crew. Similarly, in many installations the positioning of the connection is such that even where a heating source is available, the heat cannot be applied evenly to the tubing because the access by the heat source is restricted. Thus, the use of heat shrinkable tubing has had only limited applicability and has been essentially unsuitable where rapid installation or repair is needed to limit the exposure of the connections to the elements.

Protectors using chemical dilation and shrinking have been considered in the past, but until recently were not practical. Those materials preferentially used in the industry had a limited degree of diameter change, and the variations in diameters of cables and cable connection hardware were greater than the structure of such prior art cable protectors utilizing chemical dilation could accommodate. Recently, however, new protector products which are chemically dilatable over an appropriate range of cable and cable connector sizes have been formulated and developed by one of the applicants herein. The new protector products have met with substantial success in the field, since they are easy to install and use and provide for superior protection as compared to the competitive materials. The new products are the subject of pending U.S. patent application Ser. No. 08/541,135, filed Oct. 11, 1995, by co-inventor Michael G. Jones.

Those new products, while quite successful, have (like the prior art products before them) been recognized as having a pervasive and disagreeable odor, due to the nature of the dilation solvents which have been necessary for their manufacture and operation. While odor does not affect their superior installation and performance, it is annoying and unpleasant to the installation workers who must handle the products and can affect the ambient environment for a time, especially when the protectors are installed in a confined space. Until now, however, no formulations of solvents were known which did not have a harsh odor of some kind and yet were effective for dilation of the new products. Different solvents were known to have different odors, but all were pervasive, disagreeable and much disliked by the installation workers.

SUMMARY OF THE INVENTION

The present invention represents a significant improvement over the products previously developed by co-applicant Jones and claimed in the aforementioned patent application, in that the products of this invention are of a "low odor" formulation which imparts essentially no unpleasant odor to the product. The products of this invention are therefore not only as useful and exceptionally functional as the prior Jones products, but now are also "user friendly," in that they can be handled and installed without creating an environment disagreeable to the installer, or imparting a disagreeable odor to their surroundings once installed. This is accomplished by incorporating into the product a novel combination of solvents which synergistically provide the requisite dilation and evaporation shrinkage properties to the product but which do not generate any unpleasant or disagreeable odor.

The invention therefore is of a "low odor" protective cover for a cable connection or splice which is essentially free of disagreeable odors, which can be easily installed, quickly shrunk into tight vapor resistant protective covering within a matter of a few minutes rather than requiring extended periods of time, and can be installed without the need for any application of heat or use of special tools, equipment or materials. It will be seen that this invention thus is a substantial improvement not only over the heat shrink products of the past, since the protective device of the present invention shrinks entirely by evaporation of the swelling agent and does not require any effort on the part of the installer, nor the application of any tools or heat sources, but also over the prior Jones products because of the lack of disagreeable odor. The present device is easy to install, merely sliding down the cable once the connection is made, and thus can be satisfactorily installed even in locations where access is difficult (such as a connection being made in a recessed hole) or when inclement weather such as rain would make use of a heating device either awkward or impossible. Further, even in a confined location, the new products do not impart a pervasive, lingering disagreeable odor to the ambient environment.

The device comprises two interfitting sleeves which are chemically swellable and which are initially in dilated configuration, such that they subsequently shrink into place merely by evaporation of the volatile swelling solvent and cooperatively and synergistically seal the cable connection against exposure to ambient atmospheric conditions, dust, moisture, etc. The critical element in the present invention is the dilating agent, which is used is a mixture of a $C_7$-$C_8$ aliphatic hydrocarbon component and a fluorocarbon component, both components being liquid and volatile at ambient conditions. In preferred embodiments, the hydrocarbon component comprises a plurality of $C_7$-$C_8$ hydrocarbon compounds, preferably a mixture of heptane and octane isomers. The octane isomer:heptane isomer ratio is commonly 1.5–6:1, preferably 2–5:1. The fluorocarbon component normally comprises a chlorofluorocarbon compound, preferably a chlorofluoromethane, chlorofluoroethane or chlorofluoropropane compound, and more preferably a dichlorofluoroethane compound. The two components are normally in a volumetric ratio of 2–20:1, preferably 5–12:1 hydrocarbon component to fluorocarbon component.

Therefore, in its broadest embodiment, the invention is a protective cover for a cable connector, the connector being affixed to an end of a cable and having an outside diameter greater than an outside diameter of the cable, the cover comprising an outer elongated annular sleeve formed from a first material expandable by contact with a first dilating chemical composition and shrinkable upon removal of the contact with the first chemical composition; an inner elongated annular sleeve formed from a second material expandable by contact with a second dilating chemical composition and shrinkable upon removal of the contact with the second chemical composition, the inner elongated annular sleeve being disposed within the outer sleeve; each of the first and second chemical compositions comprising a mixture of a $C_7$-$C_8$ aliphatic hydrocarbon component and a fluorocarbon component, both components being liquid and volatile at ambient conditions; the cover with the sleeves in chemically expanded state being moveable into disposition covering the connector and a portion of the cable attached thereto, with the inner sleeve covering at least the portion of the cable but not the connector; whereby when the cover is so disposed over the connector and the portion of the cable and removed from contact with a source of the first and second chemical compositions, the first and second chemical compositions evaporate from the sleeves and the sleeves thereupon shrink to diameters wherein wall thickness of the inner sleeve fills the space between the outside diameters of the connector and the attached portion of the cable sufficiently to permit shrinkage of the outer sleeve to form a tightly fitted and substantially immovable covering secured around the connector and at least a portion of the inner sleeve, thereby preventing the connector from coming into contact with adverse ambient components.

In its configuration as a splice connector, the invention is defined as being for covering the junction between two cables, each cable being attached to a connector with the connectors being interfitting, with the cover further comprising a pair of the inner elongated annular sleeves each formed from a second material expandable by contact with a second dilating chemical composition and shrinkable upon removal of the contact with the second chemical composition, both the inner elongated annular sleeves being disposed within the outer sleeve and spaced apart from each other; each the inner sleeve in chemically dilated configuration being moveable to cover that portion of a respective one of the cables attached to a respective one of the connectors; and the outer sleeve in chemically dilated configuration with the inner sleeves therewithin being moveable to cover both of the connectors and a portion of each of the inner sleeves when the connectors are interfitted; whereby when the cover is so disposed over the connectors and the portions of the cables and removed from contact with the chemical compositions, the chemical compositions evaporate from the sleeves and the sleeves thereupon shrink to diameters wherein wall thickness of each the inner sleeve fills the space between the outside diameters of the respective connector and the respective attached portion of the cable sufficiently to permit shrinkage of the outer sleeve to form a tightly fitted and substantially immovable covering secured around the connectors and at least a portion of each the inner sleeve, thereby preventing the connectors from coming into contact with adverse ambient components.

Both the inner sleeve and the outer sleeve are preferable made of a swellable elastomeric material, preferably a natural or synthetic rubber. Also preferably the inner and outer sleeves will be formed from the same material. Suitable rubbers include EPDM rubber, neoprene or chlorosulfonate polyethylene (Hypalon™) rubber, of which EPDM rubber is preferred.

DETAILED DESCRIPTION AND PREFERRED EMBODIMENTS

Figures 1, 2, 3, 4, 5:
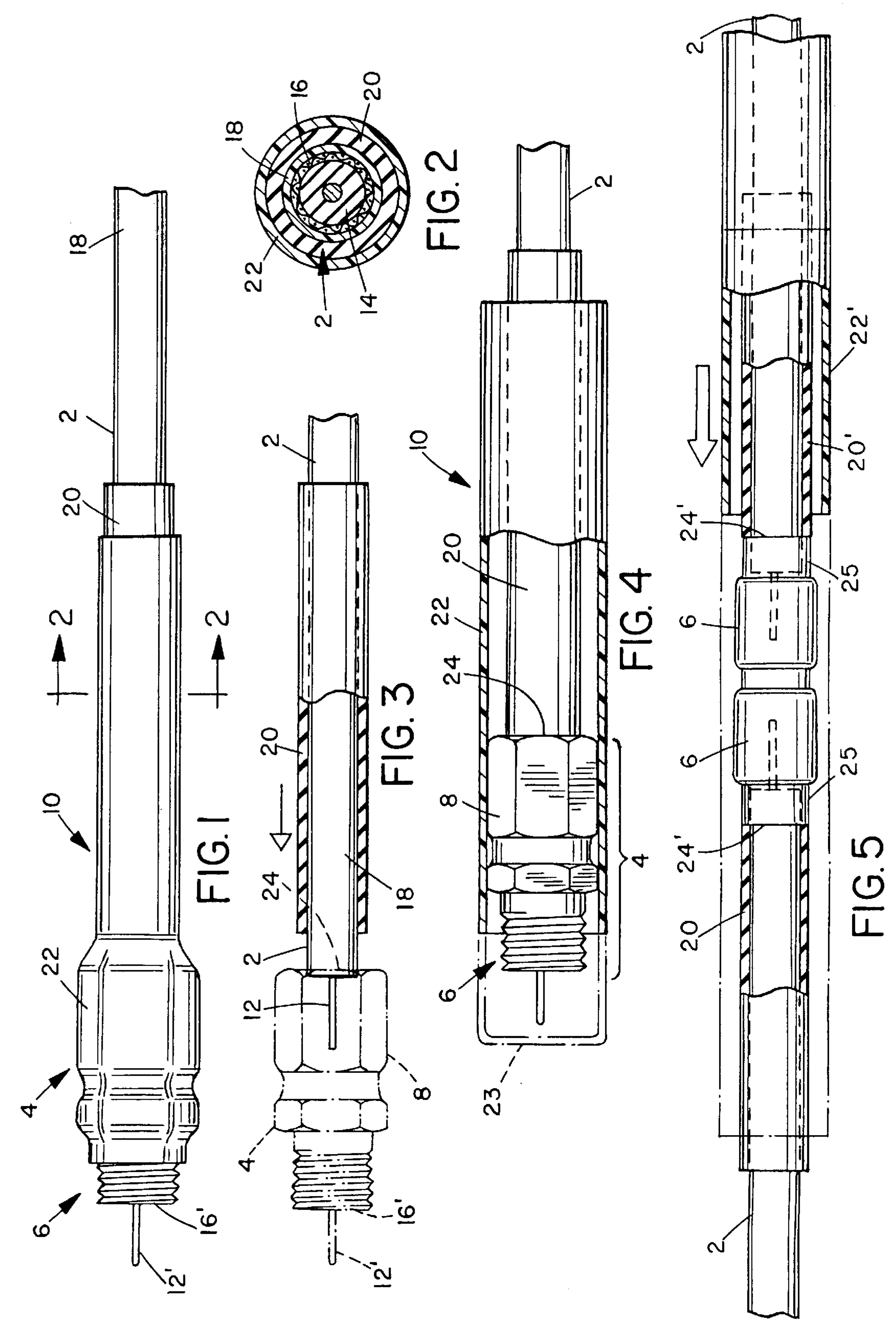
FIG. 1 is a side elevation view of a completed sleeved connector.
FIG. 2 is an enlarged sectional view taken on line 2—2 of FIG. 1.
FIG. 3 is a side elevation view of a cable end with the inner sleeve in place, a connector being indicated in broken line.
FIG. 4 is a side elevation view, with portions cut away, showing the outer sleeve in place before shrinking.
FIG. 5 is a side elevation view of a splice joint with the sleeves being adjusted to the final position.

The device of the present invention is best understood by reference to the drawings. A completed wrapped cable connection is illustrated in FIG. 1. The cable 2 itself has its own insulated and protective covering which is conventional and need not be further described. Where the cable terminates, the cable connector 4 is a combination of a screw coupling 6 and a block 8 attaching the connector 4 to the cable 2 itself. This overall connector 4 is conventional and need not be fully described. Suffice it to say that the connector provides electrical continuity from the cable 2 to the device (not shown) to which the cable is being attached. This device may be a signal transmitter or a receiving device, such as a service receptacle used to provide service such as cable television to a residence or other building, or, in the case of a cable splice, it may be another similarly fitted cable. It is this connector 4 which is to be protected from the elements, since its several separate parts makes it vulnerable to infiltration by moisture, dust, etc. which can degrade the connector and interfere with or prevent proper signal transmission between the cable and the transmitting or receiving device. (The splice configuration where two cables are connected together will be discussed below in connection with FIG. 5.) It will be understood that the cable may be a copper wire cable (as illustrated in the example) or other metal wire cable (such as aluminum cable) or may be a fiber optic cable. The nature of the cable itself and its method of signal transmission is not critical to the present invention.

The protective cover device of the present invention is generally indicated at 10. The structure of the entire system is best indicated by reference to FIG. 2. The interior electrical cable has a central conductor 12 surrounded by electrical insulation 14 (often a foam dielectric) which is surrounded by a second electrical conductor 16 (typically a ground), which in turn is surrounded by the external insulation and protective covering 18 of the cable 2. The two conductors 12 and 16 continue in an appropriate signal transmission manner through the connector 4 to appear as connections 12' and 16', respectively, for attachment to corresponding structures in the device to which the cable is to be connected. The present invention 10 surrounds the cable 2 and comprises an inner sleeve 20 and an outer sleeve 22, both of which will be described in detail below.

The outer sleeve 22 is in elongated tubular form and comprises an elastomeric material which is swellable by absorption of a chemical swelling agent and which shrinks to its initial size upon removal of such agent. Numerous rubbers and other elastomers are known to have this property and a variety of different swelling agents are available in the marketplace. In the present invention, EPDM rubber is the most desirable material. The outer sleeve will have a relatively thin wall thickness to allow it to conform readily to the various surfaces of the connector 4 and the inner sleeve 20 following shrinking.

The inner sleeve 20 is a hollow cylindrical sleeve also comprising an elastomeric material which is swellable by absorption of a chemical swelling agent and which shrinks substantially upon removal of such agent. The inner sleeve 20 will have a significantly greater wall thickness than the outer sleeve 22, although it should be capable of being flexed modestly when necessary to be able to be slid over the cable and into abutment with the block 8 during installation. However, the inner sleeve 20 should have sufficient rigidity to prevent the cable from flexing significantly at the point of attachment to the connector 4, so that the cable does not become frayed or broken at that vulnerable point. The annular wall thickness of the inner sleeve 20 will be such that effective diameter of the cable 2 is extended toward or even out to substantially the diameter of the block 8. The two sleeve thus interact to allow formation of moisture-, dust-, etc.- tight seal, as the inner sleeve forms a wider effective diameter to which the outer sleeve can shrink, and the inner sleeve itself shrinks tightly against the cable.

Inner sleeve 20 will also be made of an elastomeric material which is swellable by absorption of a chemical swelling agent and which shrinks substantially upon removal of the agent. While the inner sleeve can be of any such material, it is preferred, for both economic and technical reasons, to form both sleeves from the same material. The costs of handling, storing and processing different materials are thus avoided. Most importantly, however, the two sleeves will swell and shrink in the same manner when contacted with or freed from the solvent.

A number of elastomers suitable for use in the present invention are widely described in the literature. See, for instance, Morton, RUBBER TECHNOLOGY (2nd edn.: 1973). Most preferred are the terpolymers known as "EPDM" rubbers and made from ethylene/propylene diene copolymer with a methylene component. EPDM rubbers are described in detail in chapter 9 of the Morton reference. Other suitable rubbers include the neoprene (polychloroprene) rubbers and the chlorosulfonated polyethylene rubbers (the latter available under the trademark "HYPALON"); both of these are described in Morton, chapter 13. Commercial sources of the various elastomers are also listed.

In the prior Jones product the dilation agent was exemplified by the aromatic compounds benzene, toluene or one of the xylenes. It was mentioned that other then-known swelling agents could be used for dilation. However, at that time no dilation agent was known which had all the properties of being free of pervasive, offensive odor, capable of dilating the elastomers sufficiently to allow manufacture and use of cable connection covers, safe, readily handled and sufficiently economical for practical use. Standard industry texts, such as the annually published RUBBER RED BOOK (Argus Business Press), listed the aromatics benzene, toluene and the xylenes as the principal swelling or dilation agents; many of the other swelling agents found in the literature were mainly known only at the laboratory level. The aromatics themselves of course have drawbacks; they are expensive, have strong and disagreeable odors, are subject to numerous environmental restrictions and often require special handling or disposal.

Use of a novel "low odor" dilation composition, which is a combination of non-aromatic compounds, is a critical element of the present invention. Specifically, good dilation and subsequent evaporation with low odor emissions are obtained by use of a mixture of at least one $C_7$-$C_8$ aliphatic hydrocarbon component and at least one fluorocarbon component, both components being liquid and volatile at ambient conditions, as the dilation composition. Normally the hydrocarbon component is a mixture of two or more $C_7$-$C_8$ aliphatic hydrocarbon compounds, preferably a mixture of heptane and octane isomers. The octane isomer:heptane isomer ratio is commonly 1.5–6:1, preferably 2–5:1. Good results have been obtained with liquid isoparaffinic mixtures commercially available under the tradename "ISOPAR" from Exxon Chemical Co. The best results to date, however, have been obtained when using liquid aliphatic mixtures commercially available from Phillips Chemical Co. under the tradename "SOLTROL." Particular success has been obtained with the mixture available under the trade designation "SOLTROL 10," which is identified by the vendor as a mixture of, by volume, 28% heptane isomers and 72% octane isomers, of which 62% is 2,2,4-trimethylpentane and 10% is other octane isomers. There is no significant aromatic content.

The fluorocarbon component is normally a chlorofluorocarbon compound, preferably a chlorofluoromethane, chlorofluoroethane or chlorofluoropropane compound, and more preferably a dichlorofluoroethane compound. Particularly good results have been obtained with 1,1-dichloro-1-fluoroethane, available commercially under the trade designation "FLUOROCARBON 141B" from ICI General Chemicals.

The two components are normally present in a volumetric concentration of about 60%–99%, preferably about 80%–95%, of the hydrocarbon component, with the balance being the fluorocarbon component. A particularly preferred embodiment is a mixture containing (by volume) 90% of the SOLTROL 10 hydrocarbon mixture and 10% of the FLUOROCARBON 141B 1,1-dichloro-1-fluoroethane; this combination is preferred for the "volatile dilation composition" used in the practice of the invention.

The combination is a "low odor" composition. By "low odor" is meant that, in contrast to the prior art products and the previous Jones products, the products of this invention do not exhibit any pervasive, harsh, disagreeable or otherwise unpleasant odor. As with any elastomer-based product, there may be a slight rubbery odor, but nothing that is offensive or strong. These products are therefore greatly improved in acceptability to users, since the mild odors which may be present are completely inoffensive.

In the preferred practice of the invention the inner sleeve 20 is placed within the outer sleeve 22 and the two are immersed in the volatile dilation composition, preferably within a liquid- and vapor-tight container into which the appropriate quantity of the solvent combination has previously been measured. (A small excess of free dilation composition may often also be present inside the container, to insure that the sleeves are fully saturated.) Within the container the sleeves 20 and 22 become dilated and expanded as they become saturated with the composition. The container is sealed promptly, which maintains the sleeves 20 and 22 in their swollen state, saturated with the dilation composition. The product is provided to the field sealed in the vapor tight container, to prevent escape of the volatile dilation composition. On the job site, the cable installer opens the vapor tight container and withdraws the protective device 10 in its chemically dilated configuration. The device is then slipped over the cable at a point slightly behind the connector 4. The installer then makes the connection of the cable to the fitting on the transmission or reception device, or with another cable, in a conventional manner. The device 10 of this invention is then moved along the cable 2 until it reaches the base of the connector, at which point the inner sleeve 20 is butted up against the block 8 as indicated at 24. (Some commercial connectors have a small extension or socket 25 on the back of the block 8 into which the cable fits. For such connectors the inner sleeve 20 is sized to fit over the socket 25 or to butt up against it, depending on the outer diameter and wall thickness of the socket 25.) The outer sleeve 22 (which is longer than the inner sleeve 20) is continued forward along the cable 2 until substantially all of the connector 4 is within the sleeve 22 and the connection is essentially fully covered by the sleeve 22. This is best illustrated in FIG. 1, which shows a connector almost at the point of full coverage.

Normally the inner and outer sleeves 20 and 22 are slipped over the cable either at a free end or before the installer attaches the connector 4 to the end of the cable. Repair situations are generally the same as installations, since cable damage most often occurs to the connector or at the connector/cable junction. The repairer removes the old connector 4 from the cable and installs a new connector. Prior to installing the new connector, however, the repairer slips the device 10 over the free end of the cable and subsequently moves it into position for shrinkage as described. In some repair cases it may be necessary to cut the cable some distance behind the already-emplaced connector to get the device on, in which case a splice of the type shown in FIG. 5 can later be made. It may also be possible to slit the inner dilated sleeve 20 longitudinally and slip it over the cable 2, and then slip the expanded (and usually more flexible) outer sleeve over the connector, so that the subsequent shrinkage of the outer sleeve 22 serves to pull the inner sleeve 20 together and closes the slit. Also, with some types of cable damage the cable remaining after the connector and damaged portion have been removed may be too short (commonly by a few inches) to reach the connection point. In such cases an extender is attached to the free end of the connector to bridge the gap, or an extended connector is used. In either case the outer sleeve 22 will be chosen with enough length to cover the entire connector/extender assembly.

Once the device is in place with the inner sleeve 20 butted against the back of the block 8 and the outer sleeve 22 covering substantially all of the connection (including the connector block of the cable receiving fitting), the installer's job is essentially completed. He or she only needs to leave the assembly exposed to the ambient air for a few minutes, during which time the volatile dilation composition rapidly evaporates from the sleeves 20 and 22, causing them to shrink substantially from their enlarged swollen position. The shrinking causes the outer sleeve 22 to shrink into conformity with the shape of the connector and simultaneously to become compressed against and conform to the outer profile of the inner sleeve 20, while the inner sleeve itself shrinks tightly against the outer surface of the cable 2, all of which is also best illustrated in FIG. 1.

Usually the inside diameter of the inner sleeve 20 after dilation is substantially equivalent to the outer diameter of the cable 2, such that the device in its initial dilated configuration initially will permit relatively easy fit of the inner sleeve and outer sleeve over the cable and connector. This may be a slight clearance fit, but it may also be a slight interference fit. If an interference fit, it must not be such a tight interference fit that the installer will have difficulty sliding the inner sleeve along the cable or the outer sleeve over the cable connector.

The volatilities of the dilation compositions of this invention are sufficiently low such that there will be ample time for the repairer or installer to place the device 10 over the cable 2, make the cable connection, and then slide the device into position before substantial shrinkage occurs. However, the volatilities are also sufficiently high that once the device is in place, enough shrinkage takes place within thirty minutes (and preferably less) that the connection is thereafter effectively shielded from the elements. Further evaporation of any residual dilation composition merely enhances the quality of the seal. The combination compositions of this invention include mixtures of a wide range of volatilities, and a suitable selection for any application can easily be determined by those skilled in the art. For instance, the SOLTROL 10 hydrocarbon mixture has a volatile content of essentially 100%, an evaporation rate of >1 (where butyl acetate=1), and a vapor pressure of 2.2 psia at 100° F. (15.2 kPa at 37.8° C.). Similarly, the FLUOROCARBON 141B 1,1-dichloro-1-fluoroethane also has a volatile content of essentially 100% and a vapor pressure of 10.0 psia at 68° F. (68.9 kPa at 20° C.). It will be recognized that volatility will be affected by such factors as ambient temperature, humidity and initial degree of solvent saturation. Also, where more than one product is included in the initially sealed package (as will be common for small size products), the volatility must be sufficiently low that opening the package several times to withdraw individual products does not cause the products remaining in the package to become dried out and shrink. In the last case, it will be advantageous to have the installer be sure to close the vapor-tight package promptly after withdrawing the desired product, and it may also help to have a small amount of liquid solvent in the package to maintain saturation of the remaining products.

The situation where two cables are to be connected to form a splice is illustrated in FIG. 5. The structure and materials of the splice protector 10' are substantially identical to those of the cable connection protector 10 for connection of cables to transmission or receiving devices, except that the outer sleeve (indicated as 22') is essentially of double length, and there are two inner sleeves (designated 20'), one of which is on each of the cables 2 to be connected and which is butted against the respective cable connector heads 6 as indicated at 24'. It will be noted that the two inner sleeves 20' do not contact each other, but that the outer sleeve 22' extends fully over both inner sleeves 20' as well as the two connector heads 6. (In FIG. 5 the outer sleeve 22' is shown in a partially retracted position as it would be when the splice is made. The phantom lines illustrate its final positioning.) When the device is exposed to the atmosphere and the swelling agent evaporates, the outer sleeve 22' and both inner sleeves shrink and fully encapsulate the entire assembly with no opening through the outer sleeve 22' or at either outward end of the inner sleeves 20'.

It will be noted that since the device is made of a moisture resistant material to start with, installation of the device in inclement weather or under high humidity circumstances is greatly simplified. The installer only needs to place the protective device 10 over the cable, attach the connectors to the cable and the receiving device, shield the assembly from moisture as much as possible for the few moments it takes to make the electrical connection of the cable with the receiving device and then, still shielding the connection from the moisture, slide the protective device of this invention into place over the completed connection. Even thought the shrinkage of the protective device has only begun with the initial evaporation of the dilation composition, the moisture impervious nature of the outer sleeve 22, being made of a hydrophobic elastomeric material, sheds the moisture away from the coupling even while it is shrinking into place, thus effectively preventing moisture incursion even before the shrinkage is substantially completed. This is of considerable advantage for making repairs to damaged cables in inclement weather such as rain or snow, since the installer need only protect the coupling and coupling area of the cable and the receiving device for a few moments while the connection is made and the protective device moved into position. The same will be true for other weather elements, such as snow or sleet, although in the case of blowing dust the installer preferably will shield the connection area from dust as much as possible, to minimize the amount of dust which might otherwise blow into and become trapped underneath the sleeves. Entrapment of a minute amount of dust is normally of no consequence.

The device of this invention can also be in the form of an end cap 23 as illustrated in FIG. 4. By having one end closed the device can be used to protect a disconnected cable connector from the elements, and then have the cable later available for use merely by cutting off the capped end of the device. The device in the end cap configuration will be installed by having only the inner sleeve 20 placed over the cable prior to installation of the connector, and then the outer sleeve 22 slid over the entire assembly of connector 4 and inner sleeve 20 prior to shrinkage.

It will be seen that this invention is a substantial improvement over the heat shrink products of the past, since the protective device of the present invention shrinks entirely by evaporation of the swelling agent and does not require any effort on the part of the installer, nor the application of any tools or heat sources. The present device is easy to install, merely sliding down the cable once the connection is made, and thus can be satisfactorily installed even in locations where access is difficult (such as a connection being made in a recessed hole) or when inclement weather such as rain would make use of a heating device either awkward or impossible. In addition, as compared to not only the older prior products but also the Jones products, the products of the present invention do not have any disagreeable or pervasive odor, and can be considered to be essentially odor-free. It will be recognized that this is an important advantage for use of the products generally, but in particular will be advantageous where the installer must work in a confined area, such as in a manhole or in a closed or cramped connection enclosure.

Those skilled in the art will immediately recognize that there are numerous embodiments of the present invention which, while not expressly described above, are clearly within the scope and spirit of the invention. The above disclosure is therefore intended to be exemplary only, and the scope of the invention is to be limited solely by the appended claims.

We claim:

1. A protective cover for a cable connector, said cover comprising:

a cable having an end to which is affixed said connector, said connector having an outside diameter greater than an outside diameter of said cable;

an outer elongated annular sleeve having two ends and formed from a first material expandable by contact with a first dilating chemical composition and shrinkable upon removal of said contact with said first chemical composition;

an inner elongated annular sleeve having two ends and formed from a second material expandable by contact with a second dilating chemical composition and shrinkable upon removal of said contact with said second chemical composition, said inner elongated annular sleeve being disposed within said outer sleeve;

each of said first and second chemical compositions comprising a mixture of a $C_7$-$C_8$ aliphatic hydrocarbon component and a fluorocarbon component, both components being liquid and volatile at ambient conditions;

said cover with said sleeves in chemically expanded state being moveable into disposition covering said connector and a portion of said cable attached thereto, with said inner sleeve covering at least said portion of said cable but not said connector;

whereby when said cover is so disposed over said connector and said portion of said cable and removed from contact with a source of said first and second chemical compositions, said volatile components of said first and second chemical compositions evaporate from said sleeves and said sleeves thereupon shrink to diameters wherein wall thickness of said inner sleeve fills the space between the outside diameters of said connector and said attached portion of said cable sufficiently to permit shrinkage of said outer sleeve to form said protective cover secured around said connector and at least a portion of said inner sleeve, thereby preventing said connector from coming into contact with adverse ambient components.

2. A cover as in claim 1 wherein said inner and outer sleeves are formed from the same material.

3. A cover as in claim 1 wherein said material comprises an elastomeric material.

4. A cover as in claim 3 wherein said material comprises a natural or synthetic rubber.

5. A cover as in claim 4 wherein said material comprises a synthetic rubber.

6. A cover as in claim 5 wherein said synthetic rubber is EPDM rubber, neoprene or chlorosulfonate polyethylene rubber.

7. A cover as in claim 1 wherein said $C_7$-$C_8$ aliphatic hydrocarbon component in at least one of said first and second chemical compositions comprises a plurality of $C_7$-$C_8$ aliphatic hydrocarbon compounds.

8. A cover as in claim 7 wherein said plurality of $C_7$-$C_8$ aliphatic hydrocarbon compounds comprises a mixture of heptane and octane isomers.

9. A cover as in claim 8 wherein the volumetric ratio of said octane isomers to said heptane isomers is in the range of 1.5–6:1.

10. A cover as in claim 9 wherein the volumetric ratio of said octane isomers to said heptane isomers is in the range of 2–5:1.

11. A cover as in claim 1 wherein said fluorocarbon component comprises a chlorofluorocarbon compound.

12. A cover as in claim 11 wherein said chlorofluorocarbon compound comprises a chlorofluoromethane, chlorofluoroethane or chorofluoropropane compound.

13. A cover as in claim 12 wherein said chlorofluorocarbon compound comprises a dichlorofluoroethane compound.

14. A cover as in claim 13 wherein said chlorofluorocarbon compound comprises a 1,1-dichloro-1-fluoroethane.

15. A cover as in claim 1 wherein said $C_7$-$C_8$ aliphatic hydrocarbon component is present in an amount in the range of about 60%–99% by volume of said mixture and said fluorocarbon component is present as the balance of said mixture.

16. A cover as in claim 15 wherein said $C_7$-$C_8$ aliphatic hydrocarbon component is present in an amount in the range of about 80%–95% by volume of said mixture and said fluorocarbon component is present as the balance of said mixture.

17. A cover as in claim 16 wherein said $C_7$-$C_8$ aliphatic hydrocarbon component is present in an amount in the range of about 90% by volume of said mixture and said fluorocarbon component is present as the balance of said mixture.

18. A cover as in claim 1 wherein removal of contact between said sleeve materials and said respective chemical compositions comprises evaporation of said volatile components of said chemical compositions upon exposure to air.

19. A cover as in claim 1 wherein both of said sleeves are formed of the same material and said first and second chemical compositions are the same composition.

20. A cover as in claim 1 wherein said outer sleeve is open at said two ends, such that when said sleeve is shrunk into place a connecting face of said connector is exposed through one of said open ends for electrical connection to an electrical device.

21. A cover as in claim 20 wherein said outer sleeve is open at both ends, such that when said sleeve is shrunk into place said connecting face of said connector is exposed through one of said two open ends for electrical connection to a television transmission cable.

22. A cover as in claim 1 wherein said outer sleeve is open at only one of said two ends and closed at another of said two ends, said open one of said two ends being that end disposed around said portion of said cable, such that when said sleeve is shrunk into place said connecting face of said connector is protected from exposure to the ambient environment.

23. A cover as in claim 1 for covering the junction between said cable and a second cable of like construction, each cable having its respective said end attached to a respective said connector with said connectors being interfitting, said cover further comprising:

a pair of said inner elongated annular sleeves each formed from said second material expandable by contact with said second dilating chemical composition and shrinkable upon removal of said contact with said second chemical composition, both said inner elongated annular sleeves being disposed within said outer sleeve and spaced apart from each other;

each of said inner sleeves in chemically dilated configuration being moveable to cover that portion of a respective one of said cables attached to a respective one of said connectors; and said outer sleeve in chemically dilated configuration with said inner sleeves therewithin being moveable to cover both of said connectors and a portion of each of said inner sleeves when said connectors are interfitted;

whereby when said cover is so disposed over said connectors and said portions of said cables and removed from contact with said chemical compositions, said chemical compositions evaporate from said sleeves and said sleeves thereupon shrink to diameters wherein wall thickness of each said inner sleeve fills the space between the outside diameters of said respective connector and said respective attached portion of said cable sufficiently to permit shrinkage of said outer sleeve to form said protective cover secured around said connectors and at least a portion of each said inner sleeve, thereby preventing said connectors from coming into contact with adverse ambient components.

24. A cover as in claim 23 wherein said inner and outer sleeves are formed from the same material.

25. A cover as in claim 23 wherein said material comprises an elastomeric material.

26. A cover as in claim 25 wherein said material comprises a natural or synthetic rubber.

27. A cover as in claim 26 wherein said material comprises a synthetic rubber.

28. A cover as in claim 27 wherein said synthetic rubber is EPDM rubber, neoprene or chlorosulfonate polyethylene rubber.

29. A cover as in claim 23 wherein said $C_7$-$C_8$ aliphatic hydrocarbon component in at least one of said first and second chemical compositions comprises a plurality of $C_7$-$C_8$ aliphatic hydrocarbon compounds.

30. A cover as in claim 29 wherein said plurality of $C_7$-$C_8$ aliphatic hydrocarbon compounds comprises a mixture of heptane and octane isomers.

31. A cover as in claim 30 wherein the volumetric ratio of said octane isomers to said heptane isomers is in the range of 1.5–6:1.

32. A cover as in claim 31 wherein the volumetric ratio of said octane isomers to said heptane isomers is in the range of 2–5:1.

33. A cover as in claim 23 wherein said fluorocarbon component comprises a chlorofluorocarbon compound.

34. A cover as in claim 33 wherein said chlorofluorocarbon compound comprises a chlorofluoromethane, chlorofluoroethane or chlorofluoropropane compound.

35. A cover as in claim 34 wherein said chlorofluorocarbon compound comprises a dichlorofluoroethane compound.

36. A cover as in claim 35 wherein said chlorofluorocarbon compound comprises a 1,1-dichloro-1-fluoroethane.

37. A cover as in claim 23 wherein said $C_7$-$C_8$ aliphatic hydrocarbon component is present in an amount in the range of about 60%–99% by volume of said mixture and said fluorocarbon component is present as the balance of said mixture.

38. A cover as in claim 37 wherein said $C_7$-$C_8$ aliphatic hydrocarbon component is present in an amount in the range of about 80%–95% by volume of said mixture and said fluorocarbon component is present as the balance of said mixture.

39. A cover as in claim 38 wherein said $C_7$-$C_8$ aliphatic hydrocarbon component is present in an amount in the range of about 90% by volume of said mixture and said fluorocarbon component is present as the balance of said mixture.

40. A cover as in claim 23 wherein removal of contact between said sleeve materials and said respective chemical compositions comprises evaporation of said volatile components of said chemical compositions upon exposure to air.

41. A cover as in claim 23 wherein said first and second materials are the same material and said first and second chemical compositions are the same composition.

* * * * *